July 28, 1931.  L. L. STEELE  1,816,409
PROCESS OF AND APPARATUS FOR APPLYING A PROTECTIVE
COATING TO MOTION PICTURE FILMS
Filed Oct. 5, 1927

Inventor
Lawrence L. Steele
By [signature]
his Attorney

Patented July 28, 1931

1,816,409

UNITED STATES PATENT OFFICE

LAWRENCE L. STEELE, OF WASHINGTON, DISTRICT OF COLUMBIA, ASSIGNOR OF ONE-HALF TO TOM MOORE, OF WASHINGTON, DISTRICT OF COLUMBIA

PROCESS OF AND APPARATUS FOR APPLYING A PROTECTIVE COATING TO MOTION PICTURE FILMS

Application filed October 5, 1927. Serial No. 224,242.

Motion picture films, as is well known, are highly inflammable and will burst into flame if the film for any reason (such as breakage, etc.) becomes stationary before the arc light of the projection machine. These films will also take flame if brought in contact with a lighted cigarette or cigar.

The intense light and heat of the arc as used in motion picture machines causes films to become brittle so that they soon begin to break and give way at the sprocket holes; the film must then be discarded even though still satisfactory except for these defects.

One side of the standard motion picture film is essentially a coating of gelatine. This gelatine layer is very easily scratched and abraded and when such damage becomes excessive the film must be discarded. Moreover, the gelatine coating is ruined by contact with water and in addition is of a nature such that dust and other foreign matter, as well as oil, (from the mechanism of the projection machine) tends to adhere to this surface and seriously detracts from the appearance of the projected picture.

One of the objects of my invention is to provide a motion picture film with a coating on each side which will not take flame if the film for any reason stops before the arc of the projection machine; that will not take flame from contact with a lighted cigarette; that will maintain its original pliability under the destructive action of the intense rays of the arc light for a markedly longer time than the original film (thereby increasing the useful life of the film), and very materially curtailing fire hazard; that will be practically scratch proof in so far as injury to the gelatine-emulsion image is concerned and which will decrease the tendency for dust, oil or other foreign matter to adhere to the film, make it possible to clean films without injury to them in the process and make films absolutely waterproof.

Moreover, the coating which I apply to films has optical properties such that the projection values of the coated film are enhanced, i. e. a brighter, clearer picture results on the screen.

The benefits from my coating are obtained when new or old films, both positives and negatives are treated and in the case of old or used films a rejuvenation of the film is effected.

Another object of my invention is to provide a process and apparatus to apply such protective coating to the film at a minimum cost.

Figure 1:
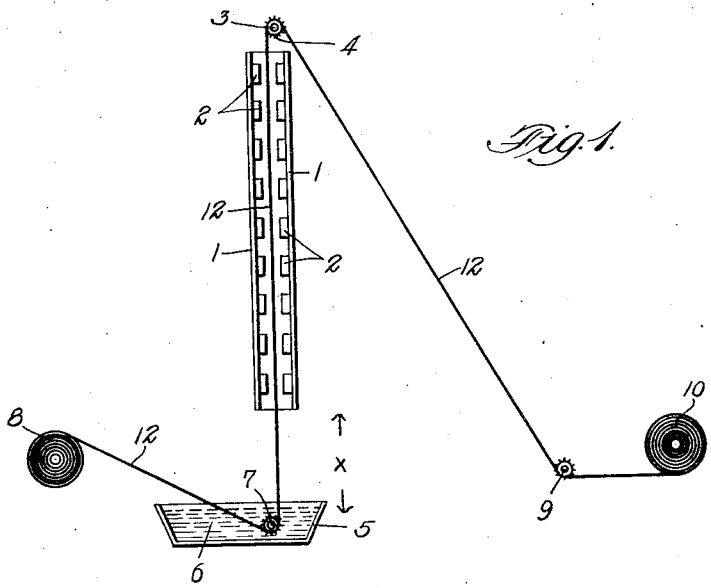
Figure 1 is a diagrammatic view of my apparatus.
Figure 2:
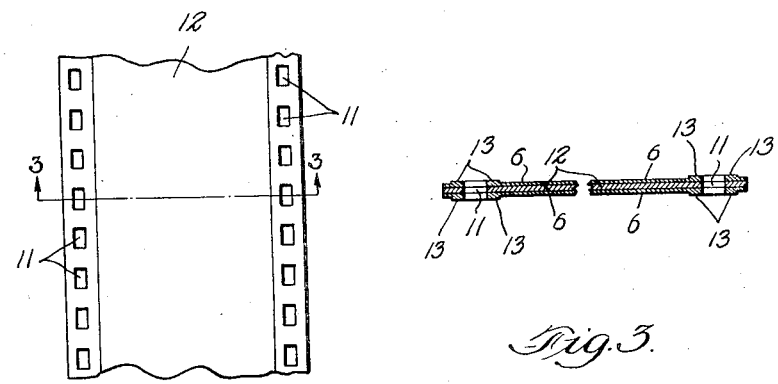
Figure 2 is a view of a motion picture film with protective coating.
Figure 3:
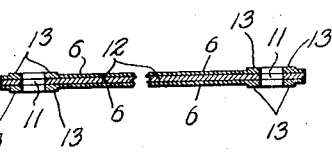
Figure 3 is a detail sectional view of the coated film.

The reference numeral 1 designates a vertically disposed oven or heating chamber preferably open at both ends, and of suitable length for the purpose of my invention, and provided with a series of suitable equidistantly spaced heat elements 2 at opposite sides thereof which may be supplied with steam, hot water, or electric current. These heat elements are also arranged in spaced transversely alined pairs at opposite sides of a central guide space traversed by the portion of the film which is being dried. At the top of the heating chamber I provide a guide roller 3 which is provided at its ends with sprocket teeth 4 which engage the sprocket holes in the side marginal portions of the film.

Below the heating chamber 1 I position a tank 5 adapted to hold the coating solution 6, and in this tank I suitably mount a guide roller 7 which is in vertical alignment with the guide roller 3 so that a portion or stetch of the film will be held in the vertical during its passage through the heating chamber between the guide rollers 3 and 7. A film holder reel 8 is suitably mounted near the coating tank 5.

A roller or pulley 9, provided with sprocket teeth at each end is suitably mounted a proper distance from the heating chamber and is driven at the desired constant speed by a motor (not shown) or other suitable means. A reel or drum 10, on which the coated film is wound, is preferably driven by a friction drive connected with the shaft of the roller 9; a friction drive in this connection being desirable so that it may automatically adapt itself to the feed of the film to the roller 10 and thereby reduce to a minimum breakage of the film at that point.

The motion picture film 12 is wound on the reel 8, from which it presses at an angle downwardly into the tank 5 and travels continuously through the solution 6 in tne tank 5 (being completely immersed in the solution), thence under the guide roller 7, the sprocket teeth of which engage the sprocket openings 11 in the film, the coated film then travels vertically from the roller 7 through the guide passage between the seats of oppositely disposed heating elements 2 in the heating chamber 1, thence over the sprocket roller 3, under the positively driven sprocket roller 9 from which it is passed at an outward and downward angle to the reel 10 on which it is wound.

The lower end of the oven is removed or terminates a certain distance above the tank 6, so that the film 12 travels vertically for a suitable distance, which can be regulated, between the roller 7 and the bottom of the oven, indicated by the arrows $x$, so that such portion of the film is exposed for a definite period to the cooling effects of the atmosphere and over this part of the film there is an even drainage of excessive coating solution from the film back into the tank 5. By this means the surplus solution taken up by the film may drain back to the receptacle 5 over a part of the film which is kept comparatively cool by exposure to the atmosphere, and before the film is subjected to the direct heat of the heating means 2 in the oven or heating chamber 1, thus ensuring the deposit of a coating of uniform and accurate thickness before any drying action occurs, and at the same time obviating any liability of the undue heating of the coating, with possibilities of undesirable results. As this drainage back of the solution takes place over a portion of the film which is held taut between the guide sprockets 4 and 7, the prevention of uneven or lumpy deposits from the solution on the film is ensured, and at the same time, the part of the film within the oven being under tension, such part of the film is maintained equidistantly spaced from the opposite sets of heating elements 2, thus ensuring its proper heating for the drying operation and obviating liability of overheating. The length of travel of the coated film in the oven, and the temperature of the oven is so arranged that the coating will be thoroughly dry when it passes over the roller 3 at the top of the oven. Again, the distance travelled by the film through the oven, and the temperature maintained in the oven is such that the pellicles of the coating which bridge the sprocket holes in the film bridging the holes will be broken during the passage of the film through the oven, and it has been found that these pellicles are disposed around the perimeter of the holes, as at 13, and function as a reinforcement to said holes, thereby reducing the liability of the holes tearing.

It will, of course, be understood that a battery of films can be coated simultaneously.

The coating is such that it is impossible to make it flare into flame, besides which its surface cannot be scratched, and it materially improves the projection from the film.

What I claim is:

An apparatus for coating both sides of a developed moving picture film having sprocket holes therein with a protective coating, said apparatus comprising a receptacle for containing the coating material in liquid form, a drying chamber arranged lengthwise vertically above said receptacle, sprocket toothed guiding elements arranged respectively above the upper end and below the lower end of the drying chamber, the lower sprocket toothed guiding element being submerged in the liquid in the receptacle, means for passing a film from a supply roll downwardly at an angle into the receptacle, thence upwardly through the liquid around the lower toothed guiding element therein so as to coat both sides of the film with the liquid, thence in the form of a vertical stretch through the drying chamber and between the lower and upper sprocket toothed guiding elements with its sprocket holes engaging the teeth of said elements, and thence downwardly at an angle from the upper guiding element to winding means, whereby the film is coated and maintained taut and under tension on its passage through the drying chamber, and heating elements extending from top to bottom of the drying chamber equidistantly on opposite sides of the line of travel of the film, whereby the film is uniformly dried on its passage through the drying chamber, the lower end of the drying chamber being removed from the receptacle to provide a free intervening space leaving a portion of the vertical stretch of the coated film exposed directly to the atmosphere to keep such portion of the film cool and to permit surplus to drain over such portion of the film back to the receptacle prior to the entrance of the film into the drying chamber and exposure of the same to the direct heat of the heating elements therein.

In testimony whereof I affix my signature.

LAWRENCE L. STEELE.